(No Model.)
W. KOPF.
SAW SET.
No. 314,944. Patented Mar. 31, 1885.
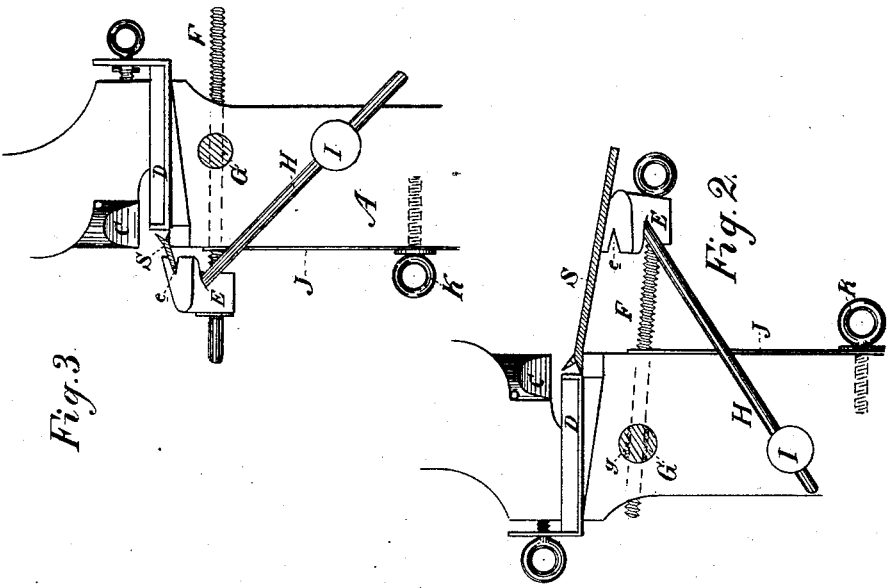
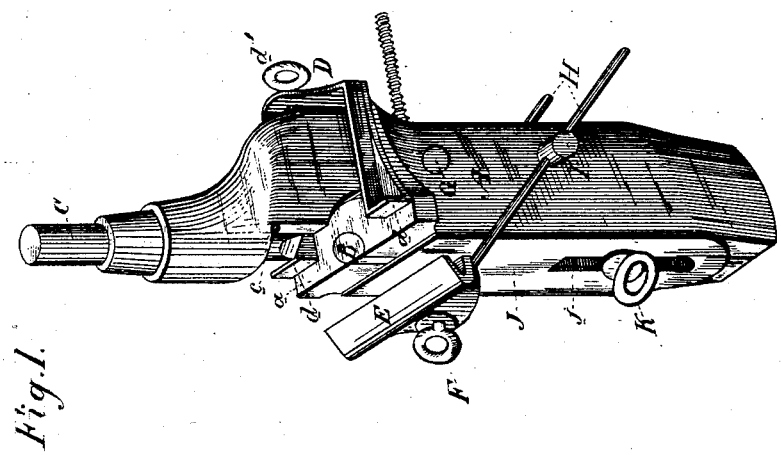
Witnesses,
Geo. H. Strong
Inventor,
Wilhelm Kopf
By Dewey & Co.
Attorneys

UNITED STATES PATENT OFFICE.

WILHELM KOPF, OF SANTA ROSA, CALIFORNIA.

SAW-SET.

SPECIFICATION forming part of Letters Patent No. 314,944, dated March 31, 1885.

Application filed August 6, 1884. (No model.)

*To all whom it may concern:*

Be it known that I, WILHELM KOPF, of Santa Rosa, county of Sonoma, and State of California, have invented an Improvement in Saw-Sets; and I hereby declare the following to be a full, clear, and exact description thereof.

My invention relates to a new and useful saw-set; and it consists in a frame-work provided with a reciprocating hammer adapted to operate against a suitable die in a peculiarly-adjustable bench or rest secured to the frame and adapted to receive and support the blade of the saw at any angle and at any distance from the die, and in an adjustable guide for the different lengths of teeth.

It further consists in the details of construction by which the bench or rest is adjusted to or from the die or plane of the hammer, and up or down to support the blade at any angle with the horizontal plane of the die.

The object of my invention is to provide a saw-set adapted for even and correct work and capable of setting the teeth of the saw at any desired angle.

Referring to the accompanying drawings for a more complete explanation of my invention, Figure 1 is a perspective view of my saw-set. Fig. 2 is a vertical section of the same, showing the saw in position supported by the adjustable bench or rest. Fig. 3 is a similar view showing a smaller saw in position supported and guided by the groove or slit in the adjustable bench or rest.

A is the frame, consisting of a vertical piece having in one face a transverse groove or recess, $a$, in the lower wall of which the die B is set. The hammer C, consisting of a suitable bar, passes through the top of the frame and extends downward into the groove or recess $a$ directly over the die B, and its lower end is properly beveled to adapt it to strike the saw-teeth. A spring, $c$, around the hammer within its seat is the means by which it is returned.

D is a guide consisting of a bar, the forward ends, $d$, of which are bent parallel with the length of the recess or groove $a$, as shown in Fig. 1. This guide is adapted to move back and forth by means of a set-screw, $d'$, which passes through its back into the frame A. The object of this guide is to regulate the distance to which the teeth of any saw are to be inserted in the recess upon the die, and this is accomplished by reason of the teeth of the saw coming in contact with the bent and parallel ends $d$ of the guide D, whereby the tooth about to be operated upon is limited and adjusted in its position under the hammer. By properly adjusting this guide it is adapted to limit the teeth of various lengths.

In order to provide a rest for the blade of the saw while its teeth are being operated upon by the hammer, I have a bench or rest, E, consisting of a strip or bar lying outside of and parallel with the recess or groove $a$ in the frame A. It is necessary that this bench or rest should have two different adjustments—one away from or toward the die, whereby saw-blades of different widths may be accommodated, and another vertically, whereby the blade may be set at any angle with the horizontal plane of the die, so that the teeth resting thereon shall be at such an angle as to enable the hammer to set them as desired. To accomplish the first of these adjustments I have a screw, F, which passes through the bench or rest and through the frame. In its course through the frame it passes through a nut, $g$, formed in a pin or bolt, G, which is adapted to rock in its bearing for the purpose of allowing the second adjustment of the bench. By operating the screw F through the nut $g$, the bench or rest E may be adjusted closer to the die B, whereby it is adapted to receive a narrow blade, or away from the die, whereby it may be adapted to receive a wider blade.

The second adjustment is accomplished as follows: It is necessary to support the bench or rest E by means of suitable braces; but it is obvious that these braces cannot be fixed, but must have a movement to provide for the movement of the bench. Accordingly, I have the arms or supports H, secured at each end of the bench or rest, and thence passing diagonally downward and loosely through the projecting ends of a pin or bolt, I, adapted to oscillate in its bearing. Now it will be seen that the bench E may be forced downward, turning upon its main pivotal bolt or pin G, and its movement being permitted by the arms H moving back and forth through the pin or bolt I, which, by oscillating in its own seat, allows the movement of the bench. Therefore, after setting the bench at any desired distance from the die B, I can then move it up or down to any angle with the horizontal plane of the die or groove a, so that the tooth may be set at a suitable angle. There must, however, be some means for holding the bench to the position adjusted, and to accomplish this I have a plate, J, lying upon the face of the frame A, and having an elongated slot, j, in its lower end, through which a set-screw, K, passes. The upper end of this plate is mounted loosely upon the adjusting-screw F. Now, when the set-screw K is loosened, plate J is adapted to move up or down with the screw F, as it is moved through its arc by the bench E; but when the set-screw K is tightened then the plate J becomes fixed and the screw F cannot be moved, and consequently the bench E is fixed in its position.

The saw S in Fig. 2 is laid upon the bench or rest E and its teeth adjusted up to the ends of the guide D, so that one of its teeth is inserted in the recess a, over the die, and is adapted to be struck by the descending hammer C; but in order to provide for very narrow blades of saws I make a slit or groove, e, in its face, into which, as shown in Fig. 3, the rear edge of the narrow-blade saw is inserted, and is thereby supported and guided while its teeth are being set.

The parts of this saw-set are to be made of such material as has been found suitable in devices of this character.

Having thus described my invention, what I claim as new, and desire to secure by Letters Patent, is—

1. In a saw-set having a suitable die and a hammer between which the teeth of the saw are fitted to be set, an oscillating rest or bench upon which the blade of the saw is supported, said rest or bench being adapted to be moved by an oscillating nut and screw to or from the plane of the die and hammer to accommodate different widths of blade, and up or down to support the blade at a suitable angle with the horizontal plane of the die, substantially as herein described.

2. In a saw-set, the frame A, having transverse recess or groove a, with the die B, and the hammer C, in combination with the bench or rest E, parallel with the recess or groove a, and an oscillating screw and threaded bolt by which said bench or rest may be raised or lowered to support the saw-blade at an angle with the horizontal plane of the groove or recess, substantially as herein described.

3. In a saw-set, the frame A, having transverse recess or groove a in its face, with a die, B, and the hammer C, in combination with the bench or rest E, parallel with the chamber or recess, and a means by which said bench or rest may be adjusted to or from said recess or groove, consisting of a screw, F, passing through the bench, and through a suitable nut in the frame A, substantially as herein described.

4. In a saw-set, the frame A, having transverse recess or groove a, with a die, B, and the hammer C, in combination with the bench or rest E, and the means by which said bench or rest is adjusted up or down to support the saw-blade at an angle with the horizontal plane of the groove or recess, consisting of the arms H, and the oscillating pin or bolt I, through which the arms loosely pass, substantially as herein described.

5. In a saw-set, the frame A, having transverse recess or groove a in its face, with a die, B, and the hammer C, in combination with the bench or rest E, and the means by which said bench or rest is adjusted to or from the recess, and up or down, consisting of the screw F, passing through the bench, the oscillating pin or bolt G, with its nut g, through which the screw F passes, arms H, and the oscillating pin or bolt I, through which said arms loosely pass, substantially as herein described.

6. In a saw-set, the frame A, having transverse groove or recess a in its face, with the die B, and the hammer C, in combination with the bench or rest E, and the means by which said bench or rest is adjusted to or from the recess or groove, and up or down, consisting of the screw F, the oscillating pin or bolt G, having nut g, through which the screw passes, arms H, and oscillating pin or bolt I, through which the arms loosely pass, and the means by which said bench or rest is fixed in any desired position, consisting of the vertically-adjustable plate J, mounted upon the screw F, and having an elongated slot, j, and the set-screw K, passing through said slot, substantially as herein described.

In witness whereof I have hereunto set my hand.

WILHELM KOPF.

Witnesses:
MATHIEU SCHRAMM,
E. T. CRANE.